A. RUFFIN.
CYCLOMETER FOR BICYCLES.
APPLICATION FILED OCT. 5, 1908.
928,473.
Patented July 20, 1909.
2 SHEETS—SHEET 2.
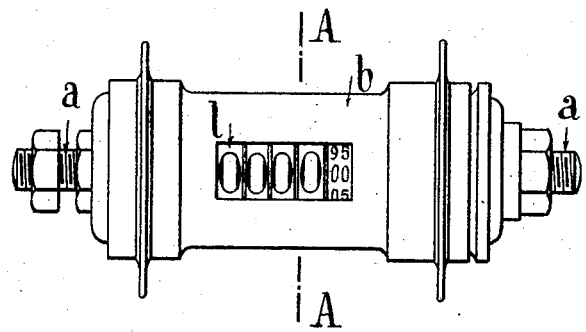
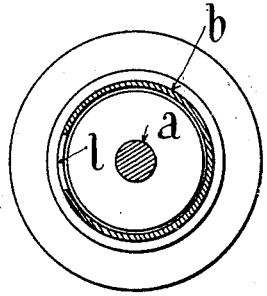
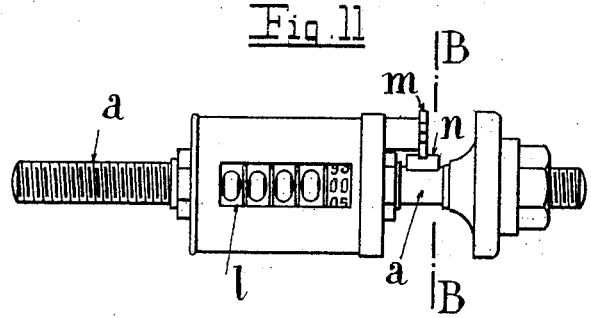
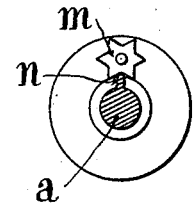

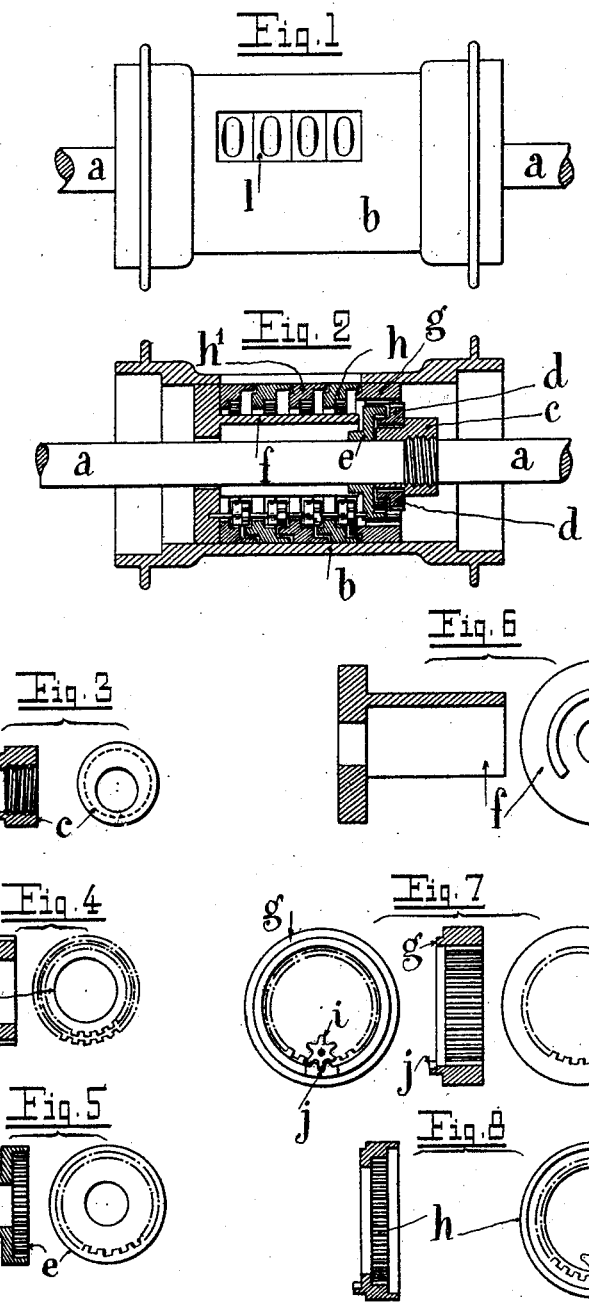

UNITED STATES PATENT OFFICE.

ALBERT RUFFIN, OF PARIS, FRANCE.

CYCLOMETER FOR BICYCLES.

No. 928,473.

Specification of Letters Patent.

Patented July 20, 1909.

Application filed October 5, 1908. Serial No. 456,248.

*To all whom it may concern:*

Be it known that I, ALBERT RUFFIN, a citizen of the Republic of France, residing at No. 77 Avenue de la Grande Armée, Paris, France, have invented certain new and useful Improvements in Cyclometers for Bicycles, of which the following is a specification.

All the speed indicators for bicycles known hitherto are controlled by a tappet that comes in contact with a star wheel fixed on the shaft of the indicator. Generally speaking the indicator is mounted on the fork of the bicycle and the tappet on the wheel; more rarely the indicator is fixed to the hub in the interior of the wheel, the star wheel extending outside and the tappet being mounted on the fork. In both cases these apparatus composed of two pieces fixed to different parts of the machine are quickly put out of order and work badly, moreover being exposed to external concussions they are very soon rendered unserviceable.

The apparatus to which the present application relates is arranged in the interior of the hubs of bicycles (the wheels of which are always situated between the forks) in such a manner that this apparatus forms part with the hubs and receives its rotary motion around the fixed shaft through the medium of pieces which are out of reach of anything that might put them out of order.

This invention is about to be described below with reference to the accompanying drawing in which:

Figure 1 is an external view of a cyclometer fixed inside the hub in accordance with the present invention. Fig. 2 is a longitudinal section of the same hub. Figs. 3, 4, 5, 6, 7 and 8 are separate illustrations of the various parts of the cyclometer given, in the combination, by way of example only. Fig. 9 is an elevation of a cyclometer fixed inside the hub in which the fixed shaft carries a tappet which regulates the movement of the indicator through the rotation of the hub in which this indicator is fixed. Fig. 10 is a transverse section through A A in Fig. 9. Fig. 11 is a front view of the indicator and of the shaft. Fig. 12 a transverse section through B B in Fig. 11.

As will be seen in the drawing Fig. 2 on the fixed shaft $a$ of the movable hub $b$ an eccentric ring $c$ is screwed, Fig. 3 on which a double wheel gear $d$ is mounted under slight friction Fig. 4. The smallest ring of teeth of the wheel gear $d$ is in engagement with a crown rim $e$ that is toothed internally and firmly connected with the hub the motion of which is transmitted to it through the medium of the sleeve $f$ Fig. 6 keyed to the hub. The largest ring of teeth of the gear $d$ engages with a crown rim $g$ Fig. 7 that rotates freely in the interior of the hub. The transmission of the motion of the rim $g$ to the first drum $h$ Fig. 8 is effected at each revolution of the wheel, by a small pinion $i$ Fig. 7 one of the teeth of which engages in a notch $j$ formed in the interior of the rim $g$. The small pinion $i$ forms part with another pinion $k$ Fig. 8 that engages with a toothed rim that acts in the interior of the drum $h$ so as to move this drum forward one unit for each revolution of the wheel, that is to say one hectometer, the ratios of the number of teeth of the various gears in engagement being suitably arranged according to the diameter of the wheel of the vehicle. At the tenth revolution of the wheel a transmission device causes the following drum $h'$ to move forward one unit, thus indicating the kilometers and so on as regards the other drums.

The device for transmitting the motion from the drum $h$ to the drum $h'$ is the same as that which actuates the drum $h$ through the medium of the rim $g$. All the drums are arranged facing an opening $l$ formed in the hub. This opening is closed by a suitable window through which the drums can be seen.

In the modification illustrated in Figs. 9 to 12 the speed indicator which may be of any kind whatever is placed and fixed in the interior of the movable hub $b$. At the end of this indicator is a star wheel $m$ by means of which the different wheels or drums of the indicator are actuated. Through the indicator as well as through the hub runs the fixed shaft $a$ which carries a tappet $n$. A window $l$ formed in the hub enables the indications on the indicator to be read off. In rotating the wheel and its hub carry the indicator along with them, so that at each revolution of the wheel one of the teeth of the star wheel $m$ comes in contact with the tappet $n$, causing this wheel to turn to the extent of a tooth and actuating the indicator so that it moves one division forward. This arrangement insures uniform regulation of the indicator while protecting it against accidental shocks.

It is of course understood that the forms, details accessories materials and dimensions of this combined hub and indicator may be varied without thereby in any way altering the principle of the invention.

What I claim and desire to secure by Letters Patent is:—

1. In combination with a bicycle hub provided with a window, a cyclometer or speed indicator comprising a series of intergeared drums arranged on the interior of the bicycle hub and visible through the window thereof.

2. In combination with a bicycle hub provided with a window, a speed indicator comprising a series of intergeared drums arranged in the interior of the hub and visible through the window thereof, and a connection between the hub and indicator for moving the former forward one notch at each revolution of the latter.

3. In combination with a bicycle hub provided with a side opening or window, a speed indicator comprising a series of intergeared drums arranged in the interior of the hub, and a connection between the hub and the indicator for moving the latter forward one notch at each revolution of the former, the drums being visible through the window of the hub.

4. In combination with a wheel hub and a fixed shaft extending longitudinally therethrough, a toothed crown rim revolubly mounted in the hub, a wheel gear revolubly mounted upon said shaft and having teeth to engage those of the crown rim, a second rim engaged with the wheel gear, a connection between said hub and said last mentioned rim, whereby the latter is caused to operate with the former, and a differential gear comprising a series of intergeared drums revolubly mounted in the hub and adapted to be moved one notch forward at each revolution of the first mentioned crown rim.

In testimony whereof I affix my signature, in presence of two witnesses.

ALBERT RUFFIN.

Witnesses:
PAUL COULOMB,
H. C. COXE.